UNITED STATES PATENT OFFICE.

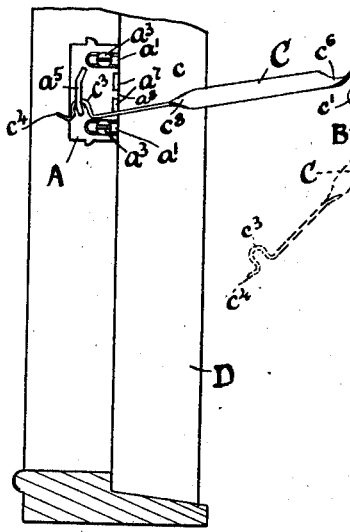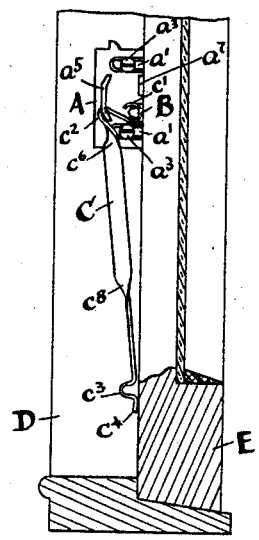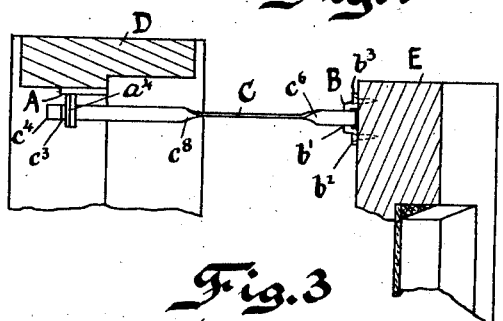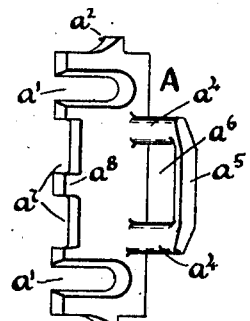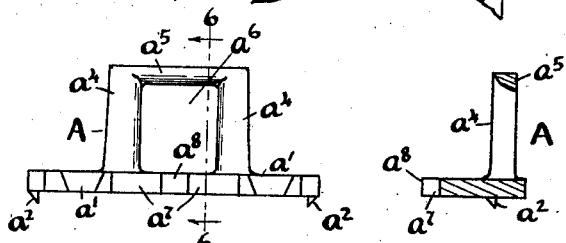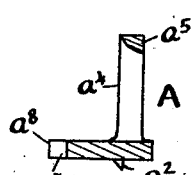

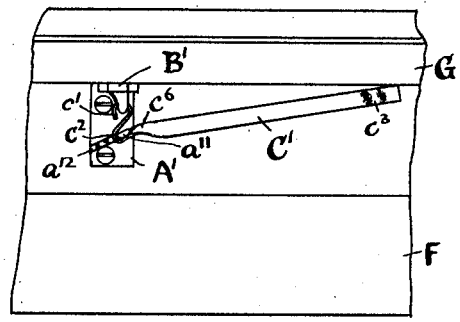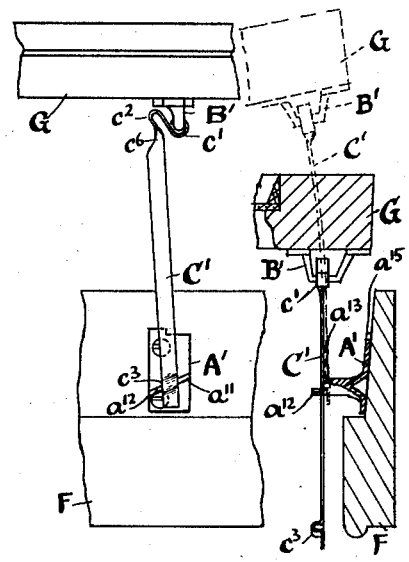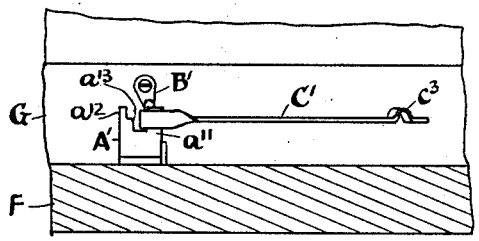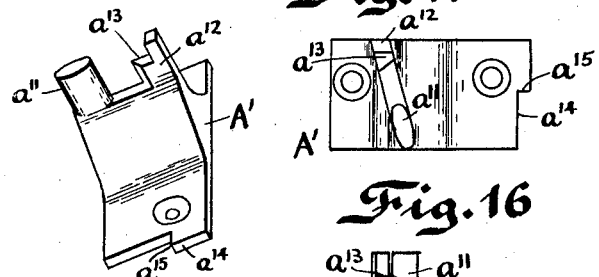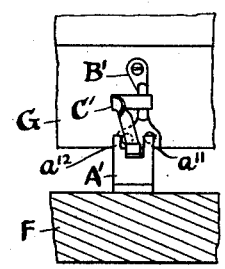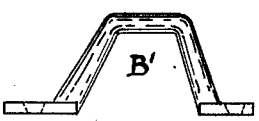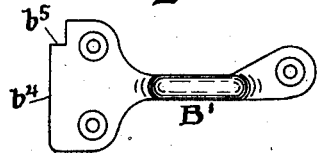

RUDOLPH G. WINTER, OF MILWAUKEE, WISCONSIN.

SHUTTER-BOWER.

1,003,389.   Specification of Letters Patent.   Patented Sept. 12, 1911.

Application filed February 10, 1910. Serial No. 543,069.

*To all whom it may concern:*

Be it known that I, RUDOLPH G. WINTER, of Milwaukee, Wisconsin, have invented a Shutter-Bower, of which the following is a specification.

This invention has for its object to provide a lock for suspension-sashes, and may be considered as an improved form of the device described and claimed by me in my United States Letters Patent No. 641,745, issued January 23, 1900.

The present improved form of fastener is adapted either for attachment to the center of the sill and lower sash-rail or to the side of the window-frame, as for instance on the blind-stop, where it is out of the way. Besides the novel principle of design necessitated by such adaptation I further aim to form the principle of action of the lock whereby in the locked or closed position of the sash any force acting upon the sash tending to open it will act to hold the lock-rod more firmly in locked position so that it cannot possibly become dismounted by any force exerted upon the sash.

One of the principal novel features of my present form of shutter-bower consists in making the lock-rod of a flattened strip instead of a round wire as heretofore; this gives it a much greater resiliency when bent into the novel form now first disclosed.

Another feature of the invention consists in the peculiar S-hook formed on the sash-end of the rod which has the double function of engaging a fixed lug in the closed position of the sash and of providing resiliency in the open position.

Other features of my invention will appear from the accompanying detailed description and are particularly specified in my claims.

In the accompanying drawings I have shown two forms of my improved shutter-bower, the first adapted for use upon the side of the sash and the second in the center thereof.

In these drawings, Figure 1 is a side elevation of the first form in position, with parts of the sash and window-frame shown in fragmentary cross-section; the parts being shown in open position; Fig. 2 is a similar view with the parts in closed position; Fig. 3 is a plan view of the same with the parts in open position; Fig. 4 is a projec-
tion on an oblique plane of the fixed element; Figs. 5 and 6 are respectively a side view and a transverse section on the plane 6 of the same; Figs. 7 and 8 are respectively a plan view and a side view of the pivot-member of the device; Fig. 9 is a side view on an enlarged scale of the sash-end of the lock-rod; Figs. 10 and 11 are respectively a plan and a front view in closed position of the second form of my shutter-bower, including parts of the window-sash and sill;
Figs. 12 and 13 are similar views and Fig. 14 is a side view of the same parts shown in open position; Fig. 15 is a perspective view, Fig. 16 is a plan view, and Fig. 17 is a side view, of the fixed member of the device;
and Figs. 18 and 19 are respectively a plan and front view of the pivot-member of the same.

In these drawings every reference letter and numeral refers always to the same part.

Describing first the side-fastener as shown on Sheet 1 of the drawings, I have shown only the left-hand fastener but it will be understood that in general one will be placed on each side of the sash, these being symmetrical with each other, or as it is known in the trade, right and left pairs. I have so devised my fastener, however, that each of the three elements which compose it can be used either as a right-hand or a left-hand fastener as desired, which saves unnecessary duplication of patterns and castings. Said three elements are designated respectively A, B, C; the first being the fixed member, adapted to be attached to the window-frame or jamb, the second the pivot-member, adapted to be attached to the sash, and the third the lock-rod, which is pivotally mounted upon said pivot-member B and engages in two pisitions, to-wit, the open and closed positions of the the fastener, with the fixed element A.

The element A consists of a plate or base adapted to be set vertically on the edge of the jamb D abutting against the sash E when closed, as shown in Figs. 1, 2 and 3, and having therein a pair of deep notches or slots a' which are a notable improvement over screw-holes, inasmuch as they not only admit of a wide latitude of adjustment relatively to the member C, but also enable the member A to be cast without cores. Now to hold the member A firmly in the place in which it is screwed down, and prevent sidewise shifting which would be apt to take place otherwise owing to the lateral shocks and strain of the wind shaking the sash and in drawing the sash tight-closed when the latter sticks due to imperfect fitting or snow or ice being lodged in the joint, the base of the member A is provided at its ends with a pair of sharp-pointed spurs $a^2$, which, when the screws $a^3$ are screwed up tight, are driven into the wood of the casing, biting holes thereinto and thus forming a rigid engagement with the window-casing, preventing such sidewise shifting. On the base rise the locking-lugs $a^4$ which are in the form of two posts joined for strength's sake by a bar $a^5$ across the ends, thus forming an eye or aperture $a^6$ in which the lock-rod C works.

The pivot-member B, which is secured to the sash in a position opposite the member A, comprises a sort of bail having a central bar $b'$ which extends out from the sash and acts as a pivot for the member C; and is provided with screw-lugs $b^2$, $b^3$, on its ends whereby it is secured to the sash. It will be noted that one of these screw-lugs $b^3$ is smaller than the other, said screw-lug being made as small as possible in order to fit into one of two recesses $a^7$ on opposite sides of the center of the outer edge of the base-plate of the member A, and still leave a tongue $a^8$ of maximum width extending out between these recesses, which I have found to be very desirable in order to give the member A a wide and sufficient lateral bearing upon the window-casing and prevent its being loosened by the side-strains to which it is subjected. Furthermore the screw-lug $b^3$ is made to fit neatly in either recess $a^7$, so that when the two members are in correct relative position on the sash and frame respectively, they engage each other. By this simple device the carpenter is aided in putting up the fastener, as the two pieces can be put together at once in the correct position, rendering any subsequent adjustment or fitting unnecessary.

Returning to the member B, it may be said that the screw-lug $b^2$, in contradistinction to $b^3$, is made of sufficient size to give the latter all necessary bearing upon the sash-stile.

The lock-rod C comprises a metal band, one end of which is bent into a double or S-shaped hook $c'$, $c^2$ (see Fig. 9), and the other end has a single hook $c^3$ the end of which is prolonged to form a tongue $c^4$. The end-loop $c'$ of the double hook forms an eye which turns upon the bar $b'$ of the member B, and the inside hook or loop $c^2$ is adapted to engage with the lower lug $a^4$ in the closed position of the sash, as shown in Fig. 2. It will be observed that in this position the lock-rod C depends vertically in a position parallel with the sash, the lower end of said rod resting against the sash, and the tension upon the hook $c'$, $c^2$ thereof exerted by any force tending to open the sash is such as to tend to turn the lock-rod farther in a counter-clockwise direction and make the lock tighter, because in this position the middle bar $c^5$ of the S-shaped hook assumes an oblique position, in which a strain tending to open the sash would make this bar $c^5$ more nearly horizontal and thus spring the hook $c'$, $c^2$ open. As previously observed, in my improved form the lock-rod C is made of a flattened strip of metal, said strip being given a longitudinal twist of 90 degrees at a point $c^6$ as close as possible to the bight of the hook $c^2$, and a second twist $c^8$ at a point sufficiently distant from the other end to impart the requisite amount of resiliency to the lock-rod to hold the hook $c^3$ (which is at right-angles to the axis of the rod) firmly in engagement with the post $a^4$ until manually raised therefrom. This is an important feature of my improved shutter-bower, the action of which is dependent on the coöperation of the hooked end $c'$, $c^2$, with the face of the sash. As will be seen from Fig. 1, the hook $c^2$ is so bent as to press upon the face of the sash before the lock-rod has been raised sufficiently to pass through the aperture $a^6$, so that the resiliency of the rod springing from the hook $c^2$ as a base is depended on to cause the hook $c^3$ to snap over the post $a^4$ when the sash is opened. To give the rod sufficient resiliency, it is desirable to have the twist $c^6$ as close as possible to the bight of the hook $c^2$ as aforesaid and furthermore such twist is so made as to produce on the inner side of the hook a slight convexity $c^7$ which coöperates with the face of the post $a^4$ in such a manner as to further assist in holding the lock-rod closed.

In the second form of my invention, Sheet 2, the letter F represents the window-sill and the letter G the lower sash-rail of the window, and the three parts or elements constituting the fastener are designated A', B', C', corresponding in form and function to the parts A, B and C respectively. The fixed member A has a pair of posts $a^{11}$, $a^{12}$, the former of which is engaged by the S-shaped hook of the lock-rod in closed position (see Fig. 10) while the post $a^{12}$ has a shoulder $a^{13}$ which acts as a support for the lock-rod in the open position (see Fig. 14). In this case the lock-rod C' has but one 90-degree twist $c^6$, the hook $c^3$ lying in a vertical plane so as to engage the shoulder $a^{13}$. When the fastener is closed the hook C' assumes a horizontal position parallel to the sash-rail as shown. When the sash is open, the lock-rod C' will be tilted with the sash so that the free end thereof would normally lie below the shoulder $a^{13}$ on which it runs, since the pivot consists of the broad flat hook $c'$ engaging the middle bar of the pivot-member $B'$, which prevents the lock-rod from having any movement in the vertical plane relative to the latter. Hence, as the sash opens, the lock-rod $C'$ is resiliently tilted and pressed against the shoulder $a^{13}$ until the hood $c^3$ registers therewith and thereupon snaps thereinto. Thus a spring-force is provided in addition to gravity for holding the lock-rod in engagement with the fixed member $A'$ in opened position. I may also provide the fixed member $A'$ with a projecting edge $a^{14}$ and shoulder $a^{15}$ destined to engage and coöperate with a corresponding edge $b^4$ and shoulder $b^5$ on the member $B$ so as to assist in mounting the two parts in correct relative position, in the same manner as hereinabove described in connection with the first form of fastener.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the proper scope of my claims. It will also be understood that while I have described the invention as applied to a shutter-bower, it could equally be applied to any hinged sash, the parts having the same relative positions with respect to the hinges.

Having thus described my invention, what I claim as new and desire to secure by Letters Patent, is:

1. In a sash-holder and lock, the combination of a member adapted to be attached to a window-frame adjacent to the sash and having a lug projecting therefrom, a pivot-member adapted to be fixed to the sash opposite said lug and having a bar which acts as a pivot, and a lock-rod having a double or S-shaped hook on one end thereof, the end-loop of said hook engaging pivotally said bar and the other loop adapted to engage in a hooked manner said lug in the closed position of the sash.

2. In a sash-holder and lock, the combination of a member adapted to be attached to a window-frame adjacent to the sash and having a lug projecting therefrom, a pivot-member adapted to be fixed to the sash opposite said lug and having a bar which acts as a pivot, and a lock-rod having a double or S-shaped hook on one end thereof, the end-loop of said hook engaging pivotally said bar and the other loop adapted to engage in a hooked manner said lug in the closed position of the sash, said rod lying adjacent and parallel to the sash in said locked position, and the point of engagement of said bar with said end-loop of said hook lying nearer the free end of the rod than the point of engagement of the other loop with said lug.

3. In a fastener for hinged sashes, in combination with a member adapted to be fixed to a window-casing adjacent to the sash when in closed position and having a projecting lug, a second member adapted to be fixed to the sash in a position opposite the first member and having a bar parallel to the axis of movement of the sash which acts as a pivot, and a lock-rod consisting of a flattened strip or bar having one end bent into an S-shaped hook which pivotally engages said bar and is adapted to engage the lug on said first member, said flattened strip having a longitudinal bend of 90 degrees at the base of said S-shaped hook whereby to stand edgewise to the sash.

4. In a fastener for hinged sashes, in combination with a member adapted to be fixed to a window-casing adjacent to the sash when in closed position and having a projecting lug, a second member adapted to be fixed to the sash in a position opposite the first member and having a bar parallel to the axis of movement of the sash which acts as a pivot, and a lock-rod consisting of a flattened strip or bar having one end bent into an S-shaped hook which pivotally engages said bar and is adapted to engage the lug on said first member, said flattened strip having a longitudinal bend of 90 degrees at the base of said S-shaped hook whereby to stand edgewise to the sash and having a hook on its free end adapted to engage said lug in the open position of said sash.

5. In a fastener for hinged sashes, in combination with a member adapted to be secured to the window-frame adjacent to the sash when in closed position and having a projecting lug, a second member adapted to be secured to the window-sash opposite said first member and having a transverse bar acting as a pivot, and a lock-rod consisting of a flattened strip having a double hook or loop on one end pivotally engaging said bar and adapted to hook over and engage said lug, said hook being formed by bending the end of said lock-rod flatwise, and said rod having a longitudinal twist of 90 degrees close to said hook or loop whereby the body thereof stands edgewise to its turning-movement.

6. In a fastener for hinged sashes, the combination of a member adapted to be attached to a window-frame adjacent to the sash and having a projecting lug, a second member adapted to be attached to the sash opposite said lug, and a lock-rod pivoted on said second member and having means for engaging said lug; said first member having a recess adapted to fit and engage a projecting portion of said second member when the latter is in the correct position with respect thereto upon the sash.

7. In a shutter-bower, a lock-rod formed of a flattened strip of metal having an eye turned at one end on which it is pivoted and a resilient bight or loop adjacent to said eye and a longitudinal twist adjacent to said bight whereby the body-portion of said rod stands in the pivotal plane and is given rigidity.

8. In a shutter-bower, a lock-rod formed of a flattened strip having an S-shaped hook turned on the pivotal end thereof, one bight of said hook forming a pivot-eye and a longitudinal twist of 90-degrees arc adjacent to said S-shaped hook.

9. In a shutter-bower, a lock-rod formed of a flattened strip having an S-shaped hook turned on the pivotal end thereof, one bight of said hook forming a pivot-eye; in conjunction with a projecting lug adapted to be attached to the window-frame and coöperating with the other bight of said S-shaped hook to hold the sash in closed position.

10. In a shutter-bower, a lock-rod formed of a flattened strip having an S-shaped hook turned on the pivotal end thereof, one bight of said hook forming a pivot-eye; and a longitudinal twist of 90-degrees arc adjacent to said S-shaped hook; the other bight of said S-shaped hook forming an abutment and adapted to coöperate with the face of the sash in limiting the pivotal movement of the lock-rod in one direction, and the body of said lock-rod beyond said hook having some resiliency in a pivotal plane.

11. In a shutter-bower, the combination of a fixed member adapted to be attached to the window-frame and having an upstanding post, a pivot-member adapted to be attached to the sash, and a lock-rod having an S-shaped hook turned on the pivotal end thereof, one bight of said hook engaging said pivot-member and the other engaging said post in the closed position of the sash; the relative positions of said pivot-member and post being such that any strain tending to open said sash when in a closed position will tend to spring open said S-shaped hook and thus produce a tighter engagement of the latter with said post.

12. In a shutter-bower, the combination of a pivoted lock-rod and a fixed member which it engages, said lock-rod being limited as regards movement in an upward direction above the horizontal and having a certain resiliency, in connection with a device on the end thereof adapted to be pressed resiliently into engagement with said fixed member when the sash is open.

In witness whereof I have hereunto set my hand this eighth day of February, 1910.

RUDOLPH G. WINTER.

In presence of—
GEORGE W. COLLES,
ROSE HOLSTENE.

---

Copies of this patent may be obtained for five cents each, by addressing the "Commissioner of Patents, Washington, D. C."